(12) United States Patent
Zhou et al.

(10) Patent No.: US 12,425,529 B2
(45) Date of Patent: Sep. 23, 2025

(54) VIDEO PROCESSING METHOD AND APPARATUS FOR TRIGGERING SPECIAL EFFECT, ELECTRONIC DEVICE AND STORAGE MEDIUM

(71) Applicant: Beijing Bytedance Network Technology Co., Ltd., Beijing (CN)

(72) Inventors: Qinghua Zhou, Beijing (CN); Shiyin Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 198 days.

(21) Appl. No.: 18/253,186

(22) PCT Filed: Nov. 15, 2021

(86) PCT No.: PCT/CN2021/130708
§ 371 (c)(1),
(2) Date: May 16, 2023

(87) PCT Pub. No.: WO2022/100735
PCT Pub. Date: May 19, 2022

(65) Prior Publication Data
US 2023/0421716 A1 Dec. 28, 2023

(30) Foreign Application Priority Data
Nov. 16, 2020 (CN) .......................... 202011280804.3

(51) Int. Cl.
*H04N 5/262* (2006.01)
*G06T 5/50* (2006.01)
(Continued)

(52) U.S. Cl.
CPC ............. *H04N 5/2621* (2013.01); *G06T 5/50* (2013.01); *G06T 5/70* (2024.01); *G06T 7/12* (2017.01);
(Continued)

(58) Field of Classification Search
CPC ...... H04N 5/2621; H04N 5/272; H04N 5/262; G06T 5/50; G06T 5/70; G06T 7/12;
(Continued)

(56) References Cited

U.S. PATENT DOCUMENTS 9,514,523 B2   12/2016   Park et al.
2010/0027961 A1   2/2010   Gentile et al.
(Continued)

FOREIGN PATENT DOCUMENTS

| CN | 102164234 A | 8/2011 |
| CN | 104574311 A | 4/2015 |

(Continued)

OTHER PUBLICATIONS

China National Intellectual Property Administration, International Search Report and Written of Opinion Issued in Application No. PCT/CN2021/130708, Feb. 7, 2022, WIPO, 12 pages.
(Continued)

*Primary Examiner* — Padma Haliyur
(74) *Attorney, Agent, or Firm* — Alleman Hall & Tuttle LLP

(57) ABSTRACT

A video processing method and apparatus, an electronic device and a storage medium are provided in the present disclosure. In the video processing method provided in the present disclosure, a target frame image of a target video is fixed in response to a triggering instruction, and a target object in the target frame image is removed, then a padding operation is performed on a target area in the target frame image so as to generate and display a padding frame image. Thus, a special effect that the target object disappears from the target video can be realized, thereby providing visual special effects of more personalized and better visual perception for a user in a video application.

19 Claims, 9 Drawing Sheets

(51) Int. Cl.
*G06T 5/70* (2024.01)
*G06T 7/12* (2017.01)
*G06V 10/25* (2022.01)
*H04N 5/272* (2006.01)

(52) U.S. Cl.
CPC ............ *G06V 10/25* (2022.01); *H04N 5/272* (2013.01); *G06T 2207/20221* (2013.01)

(58) Field of Classification Search
CPC . G06T 2207/20221; G06T 2207/10016; G06T 2207/20104; G06T 5/77; G06V 10/25
See application file for complete search history.

(56) References Cited

U.S. PATENT DOCUMENTS

| | | | |
|---|---|---|---|
| 2013/0346588 | A1 | 12/2013 | Zhang et al. |
| 2014/0184858 | A1* | 7/2014 | Yu .................... H04N 23/80 348/241 |
| 2014/0219555 | A1 | 8/2014 | Hsia et al. |
| 2015/0091900 | A1 | 4/2015 | Yang et al. |
| 2016/0350598 | A1* | 12/2016 | Yamaji ................ G06V 40/10 |
| 2018/0075304 | A1* | 3/2018 | Li ........................ G06T 7/194 |
| 2019/0132642 | A1 | 5/2019 | Wang et al. |
| 2019/0196698 | A1* | 6/2019 | Cohen .................. G10L 15/22 |
| 2021/0012502 | A1* | 1/2021 | Mulford ................ G06V 20/05 |
| 2021/0248721 | A1 | 8/2021 | Tian et al. |
| 2021/0407051 | A1* | 12/2021 | Pardeshi ................ G06N 3/088 |

FOREIGN PATENT DOCUMENTS

| | | |
|---|---|---|
| CN | 104680487 A | 6/2015 |
| CN | 108829893 A | 11/2018 |
| CN | 109215091 A | 1/2019 |
| CN | 109960453 A | 7/2019 |
| CN | 110225246 A | 9/2019 |
| CN | 110728639 A | 1/2020 |
| CN | 111161275 A | 5/2020 |
| CN | 111179159 A | 5/2020 |
| CN | 111260537 A | 6/2020 |
| CN | 111353071 A | 6/2020 |
| CN | 111416939 A | 7/2020 |
| CN | 111444921 A | 7/2020 |
| CN | 111556278 A | 8/2020 |
| CN | 111754528 A | 10/2020 |
| CN | 111832538 A | 10/2020 |
| CN | 112188058 A | 1/2021 |
| CN | 112199526 A | 1/2021 |
| CN | 112637517 A | 4/2021 |
| EP | 3945494 A1 | 2/2022 |
| JP | 2008005084 A | 1/2008 |
| JP | 2011096018 A | 5/2011 |
| JP | 2013077873 A | 4/2013 |
| JP | 2014096661 A | 5/2014 |
| JP | 2020129356 A | 8/2020 |
| JP | 7583165 B2 | 11/2024 |
| WO | 2020022055 A1 | 1/2020 |
| WO | 2020125739 A1 | 6/2020 |

OTHER PUBLICATIONS

China National Intellectual Property Administration, Office Action and Search Report Issued in Application No. 202011280804.3, Jul. 7, 2022, 8 pages.
China National Intellectual Property Administration, Office Action and Search Report Issued in Application No. 202011280804.3, Apr. 15, 2022, 17 pages.
China National Intellectual Property Administration, Office Action and Search Report Issued in Application No. 202011280804.3, Feb. 8, 2022, 17 pages.
China National Intellectual Property Administration, Office Action and Search Report Issued in Application No. 202011280804.3, Sep. 21, 2022, 6 pages.
Ni, H. et al., "Large Damaged Area Image Inpainting Algorithm Based on Matching Model for Broken Structure Line," Computer Science, vol. 43, No. 10, Oct. 2016, 6 pages. Submitted with English abstract.
"How To Improve the Communication Effect of Short Video Platform—Taking Tiktok Short Video as an Example," News Dissemination 2018.5, 4 pages. Submitted with English abstract.
Japan Patent Office, Office Action Issued in Application No. 2023528594, Jun. 4, 2024, 8 pages.
Decision to Grant a Patent for Japanese Application No. 2023-528594, mailed Oct. 1, 2024, 5 pages.
European Patent Office, Extended European Search Report Issued in Application No. 21891255.8, Mar. 14, 2024, Germany, 7 pages.
European Patent Office, Communication pursuant to Article 94(3) EPC for European Application No. 21891255.8, mailed Nov. 20, 2024, 4 pages.
ISA China National Intellectual Property Administration, International Search Report for International Application No. PCT/CN2021/117199, mailed Dec. 17, 2021, 5 pages.

* cited by examiner ered with the processor is configured to implement the video
VIDEO PROCESSING METHOD AND APPARATUS FOR TRIGGERING SPECIAL EFFECT, ELECTRONIC DEVICE AND STORAGE MEDIUM

CROSS-REFERENCE TO RELATED APPLICATION

This application is a National Stage of International Application PCT/CN2021/130708, filed on Nov. 15, 2021, which claims priority to Chinese Patent Application No. 202011280804.3, filed on Nov. 16, 2020 and entitled "VIDEO PROCESSING METHOD AND APPARATUS, ELECTRONIC DEVICE AND STORAGE MEDIUM", both of which are hereby incorporated by reference in their entireties.

TECHNICAL FIELD

The present disclosure relates to the field of video processing technologies and, in particular, to a video processing method and apparatus, an electronic device and a storage medium.

BACKGROUND

With the development of communication technologies and terminal devices, various terminal devices, such as mobile phones, tablet computers and the like, have become an indispensable part of people's work and life, and with the increasing popularity of the terminal devices, video applications become a main channel for communication and entertainment.

SUMMARY

In a first aspect, an embodiment of the present disclosure provides a video processing method, including:
  fixing a target frame image of a target video in response to a triggering instruction;
  removing a target object in the target frame image, and performing a padding operation on a target area in the target frame image so as to generate and display a padding frame image, where the target area includes a vacant area after the target object is removed from the target frame image.

In a second aspect, an embodiment of the present disclosure provides a video processing apparatus, including:
  an image acquiring module, configured to fix a target frame image of a target video in response to a triggering instruction;
  an image processing module, configured to remove a target object in the target frame image, and perform a padding operation on a target area in the target frame image so as to generate and display a padding frame image, where the target area includes a vacant area after the target object is removed from the target frame image.

In a third aspect, an embodiment of the present disclosure provides an electronic device, including:
  a processor; and
  a memory, configured to store a computer program of the processor;
  a display, configured to display a video after processing by the processor;

where the processor is configured to implement the video processing method in the above first aspect and various possible designs of the first aspect by executing the computer program.

In a fourth aspect, an embodiment of the present disclosure provides a computer readable storage medium. The computer readable storage medium stores computer execution instructions. When a processor executes the computer execution instructions, the video processing method in the above first aspect and various possible designs of the first aspect is implemented.

In a fifth aspect, an embodiment of the present disclosure provides a computer program product. The program product includes a computer program, when the computer program is executed by a processing apparatus, steps of the method in the first aspect of the present disclosure is implemented.

BRIEF DESCRIPTION OF DRAWINGS

To describe technical solutions in embodiments of the present disclosure or in the prior art more clearly, the following briefly introduces accompanying drawings required for describing the embodiments or the prior art. Apparently, the accompanying drawings in the following description show some embodiments of the present disclosure, and other drawings may also be obtained by a person of ordinary skill in the art according to these drawings without creative efforts.

DESCRIPTION OF EMBODIMENTS

Embodiments of the present disclosure will be described in more detail below with reference to accompanying drawings. Although certain embodiments of the present disclosure are shown in the accompanying drawings, it should be understood that the present disclosure may be implemented in various forms and should not be construed as being limited to the embodiments set forth herein, but rather these embodiments are provided for a thorough and comprehensive understanding of the present disclosure. It should be understood that the drawings and the embodiments of the present disclosure are only for illustrative purposes and are not intended to limit the scope of the present disclosure.

It should be understood that, steps recorded in method implementations of the present disclosure may be executed in different orders, and/or executed in parallel. Furthermore, the method implementations may include additional steps and/or omit executing illustrated steps. The scope of the present disclosure is not limited in this respect.

The term "including" and variations thereof, as used herein, is inclusive, i.e., "including but not limited to". The term "based on" is "based at least in part on". The term "one embodiment" means "at least one embodiment", the term "another embodiment" means "at least one further embodiment"; and the term "some embodiments" means "at least some embodiments". Relevant definitions of other terms will be given in the following description.

It should be noted that the modifications of "a" and "a plurality of" mentioned in the present disclosure are illustrative rather than restrictive, and a person skilled in the art should understand that they should be understood as "one or more" unless the context clearly indicates otherwise.

With the increasing popularity of terminal devices, video applications have become a main channel for communication and entertainment. In a current video application, shooting and playing a video by means of an intelligent terminal cannot meet a user's requirement for diversity of interaction manners in a process of video shooting and playing. However, in the video applications, more and more attention is paid to provide visual effects of more personalized and better visual perception for a user when the user performs video shooting and playing.

In the present disclosure, it is intended to provide a video processing method, where a target frame image of a target video is fixed in response to a triggering instruction, and a target object in the target frame image is removed, then a padding operation is performed on a target area in the target frame image so as to generate and display a padding frame image. Thus, in a process of video recording or playing, a user can input a specific instruction to implement a special effect that the target object disappears from the target video, thereby providing visual effects of more personalized and better visual perception to the user in a video interaction application.

Figure 1:
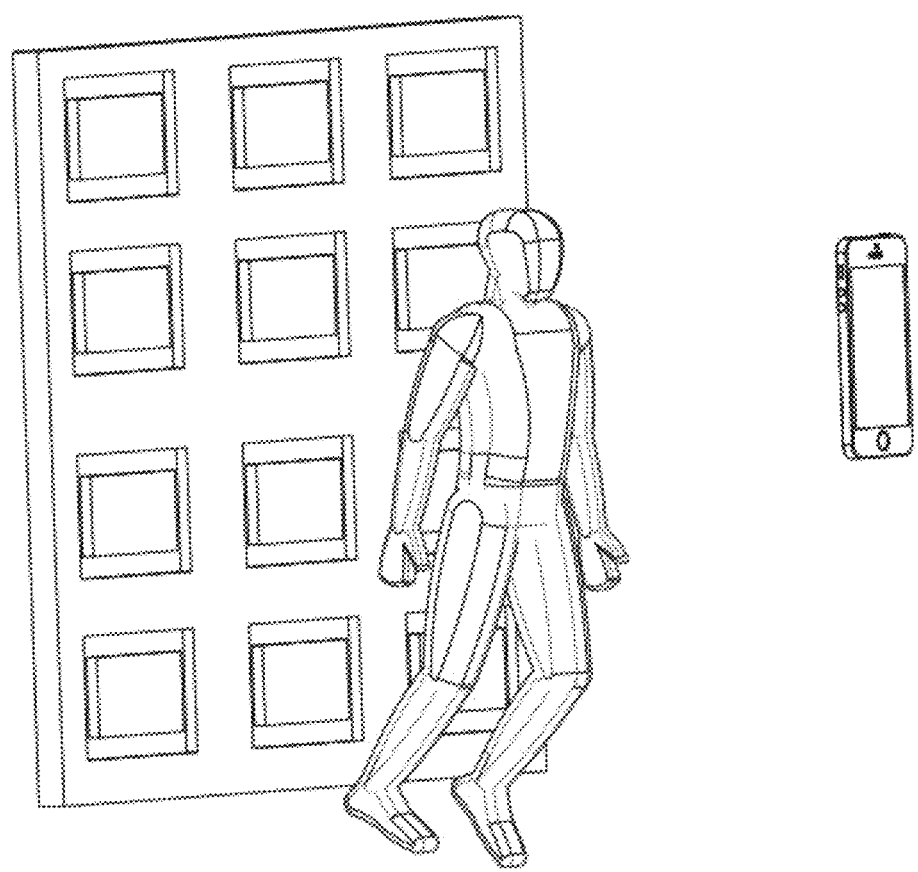
FIG. 1 is an application scenario diagram of a video processing method according to an exemplary embodiment of the present disclosure.

FIG. 1 is an application scenario diagram of a video processing method according to an exemplary embodiment of the present disclosure. As shown in FIG. 1, the video processing method provided in this embodiment may be executed by a terminal device with a camera and a display screen. Specifically, the camera (for example, a front-facing camera, a rear-facing camera, an external camera, etc.) on the terminal device may be used to record a video for a target object (for example, a person, an animal, a building, etc.), and a target video may also be played through the display screen of the terminal device.

The target object being a person may be taken as an example. In a possible scenario, when video shooting is performed on a target person by using the terminal device, generally, the camera on the terminal device is aimed at the target person for shooting. It can be understood that, the camera may also acquire a target background at the same time in addition to the target person during a framing process. In this case, a user may input a triggering instruction (for example, a target gesture instruction, a target voice instruction, a target expression instruction, a target text instruction, and a target limb instruction, etc.) to the terminal device, so as to trigger a target effect, thereby fixing a target frame image in a currently shot target video.

In another possible scenario, when a target video is played by using the terminal device, the target video includes a target background at the same time in addition to a target person. In this case, a user may input a triggering instruction (for example, a target gesture instruction, a target voice instruction, a target expression instruction, a target text instruction, and a target limb instruction, etc.) to the terminal device, so as to trigger a target effect, thereby fixing a target frame image in a currently shot target video.

It should be noted that, the triggering instruction may be a triggering instruction input by a user, may also be a triggering instruction sent by a target object in a video, and may further include a triggering instruction sent by a terminal under a preset condition (for example, a video is played to a certain preset moment, etc.). The target frame image may be a first frame image after the triggering instruction is acquired, and may also be a frame image after the triggering instruction is acquired for a preset duration. After the target frame image is fixed, a target object in the target frame image is removed, and a padding operation is performed on a target area in the target frame image, for example, a background padding operation may be performed, so as to generate and display the padding frame image, where the target area includes a vacant area after the target object is removed from the target frame image. It can be seen that, in a process of shooting or playing the target object, a triggering instruction may be used to trigger a target special effect, so that the target object is removed from the target frame image and the padding operation is performed, thereby realizing a visual effect that the target object disappears from a video.

Figure 2:
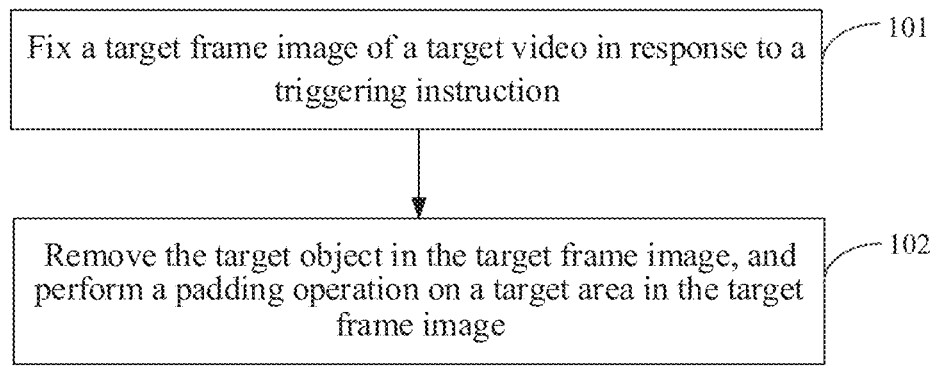
FIG. 2 is a schematic flowchart of a video processing method according to an exemplary embodiment of the present disclosure.

FIG. 2 is a schematic flowchart of a video processing method according to an exemplary embodiment of the present disclosure. As shown in FIG. 2, the video processing method provided in this embodiment includes the following steps.

Step 101: fix a target frame image of a target video in response to a triggering instruction.

In a possible scenario, when video shooting is performed on a target object by using a terminal device, a camera on the terminal device is generally aimed at the target object for shooting. It can be understood that, in a process of shooting the target object, the camera may also acquire a target background at the same time in addition to a target object.

In another possible scenario, when a target video is played by using the terminal device, a target object and a target background are usually included in the target video. It can be understood that, when the target video is shot and generated, the target object is shot based on the target background. For ease of understanding, a target person being the target object may be selected as an example for description. With continued reference to FIG. 1, when video shooting is performed on a target person by using the terminal device, a camera on the terminal device is generally aimed at the target person for shooting. It can be understood that, in a framing process, the camera may acquire the target background in addition to the target person.

When the target video is played by using the terminal device, since the target video may include the target object and the target background, relevant images of the target object in the target background are played when the target video is played.

Figure 3:
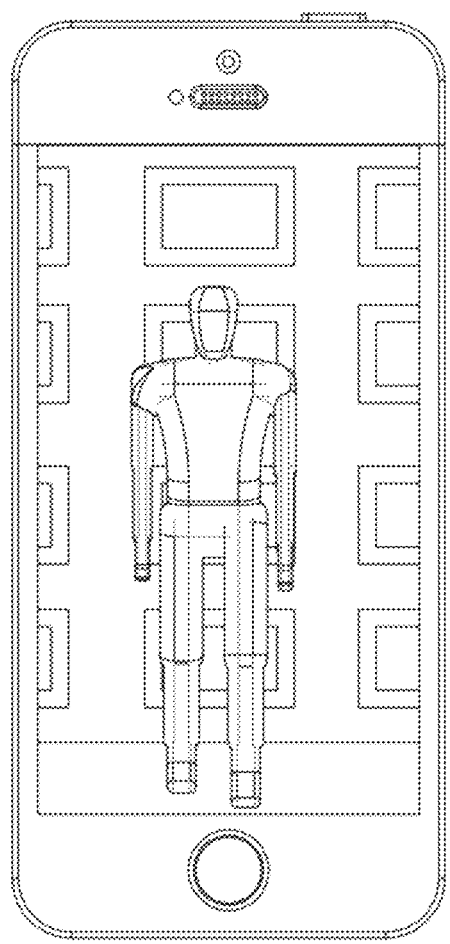
FIG. 3 is an interface schematic diagram of a process of video processing according to an exemplary embodiment of the present disclosure.

FIG. 3 is an interface schematic diagram of a process of video processing according to an exemplary embodiment of the present disclosure. As shown in FIG. 3, when video shooting is performed on a target person or a target video is played by using a terminal device, a target background and the target person are displayed simultaneously on a display screen of the terminal device.

Figure 4:
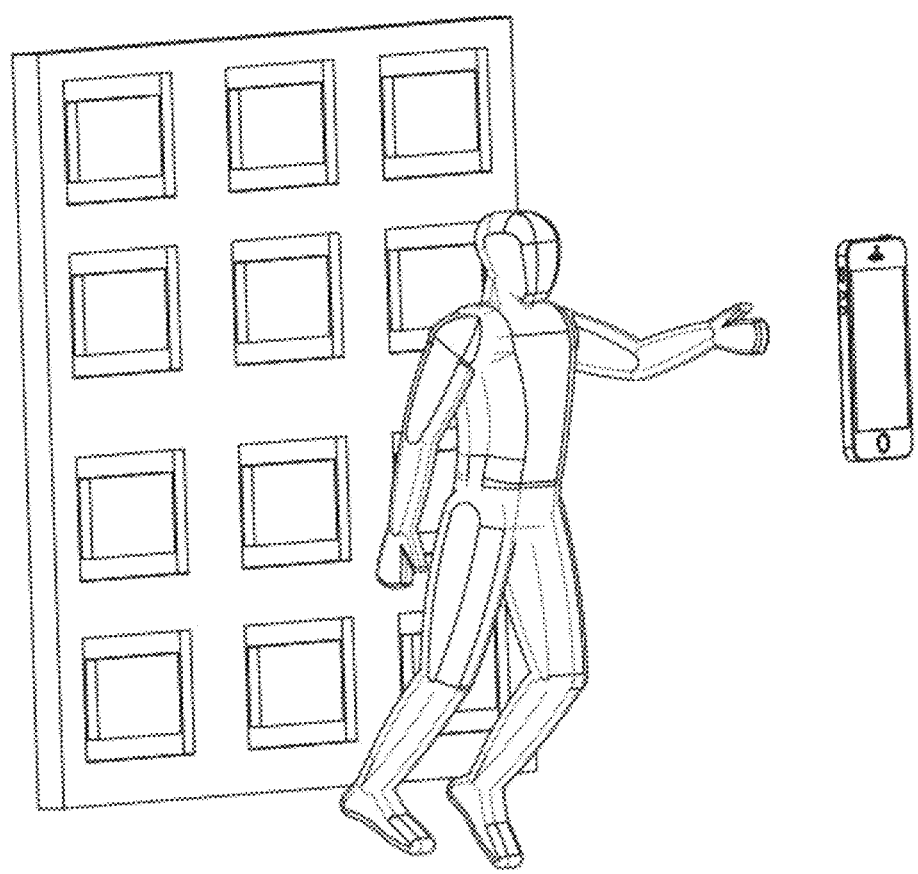
FIG. 4 is another application scenario diagram of a video processing method according to an exemplary embodiment of the present disclosure.

The terminal device fixes a target frame image of the target video in response to a triggering instruction. FIG. 4 is another application scenario diagram of a video processing method according to an exemplary embodiment of the present disclosure. As shown in FIG. 4, the scenario in FIG. 4 may be that, in a process of recording a target video for a target person, a user triggers an effect that a person disappears from an image by inputting a target gesture instruction (for example, a finger stretching instruction). When the terminal device identifies the target gesture instruction, a target frame image of a currently shot target video is fixed, where a current frame of the target video may be fixed. In an embodiment, when the terminal device plays the target video, the user may trigger an effect that a person disappears from an image by means of a target gesture instruction (e.g., a finger stretching instruction). When the terminal device identifies the target gesture instruction, a target frame image of a currently shot target video is fixed, where a current frame of the target video may be fixed.

Step 102: remove a target object in the target frame image, and perform a padding operation on a target area in the target frame image so as to generate and display a padding frame image.

After the target frame image is fixed, the target frame image may be processed to achieve an effect that the target object disappears from the target frame image. Specifically, the target object in the target frame image may be removed, and the padding operation is performed on the target area in the target frame image to generate and display the padding frame image, where the target area is a vacant area after the target object is removed from the target frame image.

Figure 5:
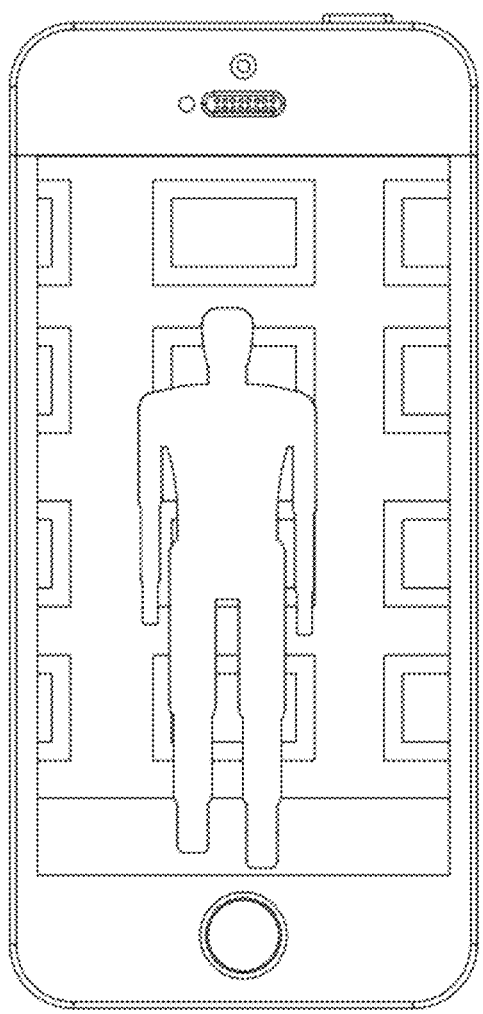
FIG. 5 is a schematic diagram of an intermediate process in a process of video processing according to an exemplary embodiment of the present disclosure.
Figure 6:
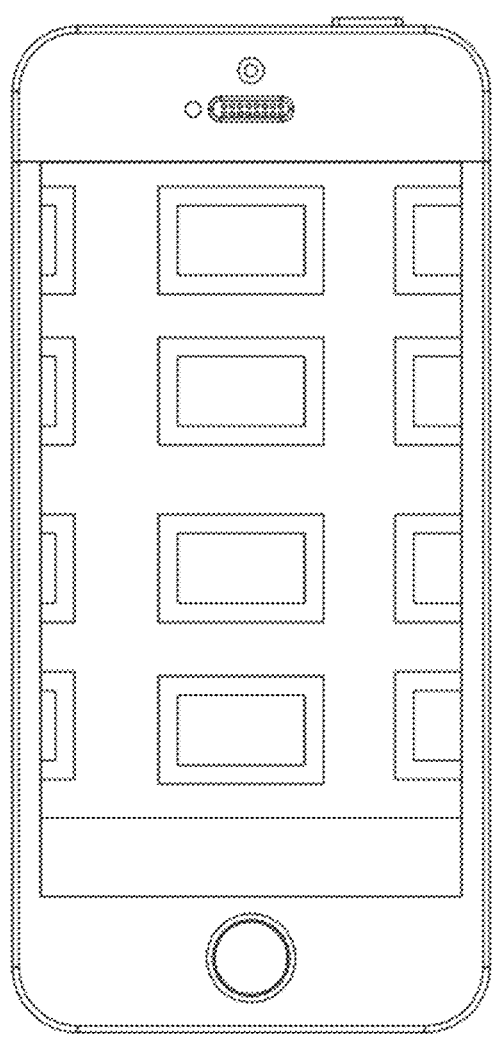
FIG. 6 is another interface schematic diagram of a process of video processing according to an exemplary embodiment of the present disclosure.

With continued reference to the example of the target person being the target object, FIG. 5 is a schematic diagram of an intermediate process in a process of video processing according to an exemplary embodiment of the present disclosure. As shown in FIG. 5, after the target frame image is fixed, the target person in the target frame image may be removed. FIG. 6 is another interface schematic diagram of a process of video processing according to an exemplary embodiment of the present disclosure. As shown in FIG. 6, a background padding operation may be performed on a target area, that is, a vacant area formed after the target person in the target frame image is removed.

Referring to FIG. 3 to FIG. 6, in a process of recording a target video for a target person, a user performs triggering by inputting a finger stretching instruction, so as to implement a special effect that the target person disappears from the target video in response to the user's gesture in the process of video recording. In addition, although not shown in the accompanying drawings, a person skilled in the art should understand that, in a process of playing the target video, the user may also implement the special effect that the target person disappears from the target video by a triggering instruction.

In addition, it should be noted that, the target person being the target object is only an example for ease of understanding, and in this embodiment, the target object may be in a form of a target person, a target animal, a target building, and the like, which is not specifically limited herein. In addition, the foregoing triggering instruction may also be in a form of a target gesture instruction, a target voice instruction, a target expression instruction, a target text instruction, a target limb instruction, and the like, which is not specifically limited herein.

In this embodiment, the target frame image of the target video is fixed in response to the triggering instruction, and the target object in the target frame image is removed, then the padding operation is performed on the target area in the target frame image so as to generate and display the padding frame image. Thus, the user can input a specific instruction to implement the special effect that the target object disappears from the target video, thereby providing visual effects of more personalized and better visual perception to the user in a video application.

Figure 7:
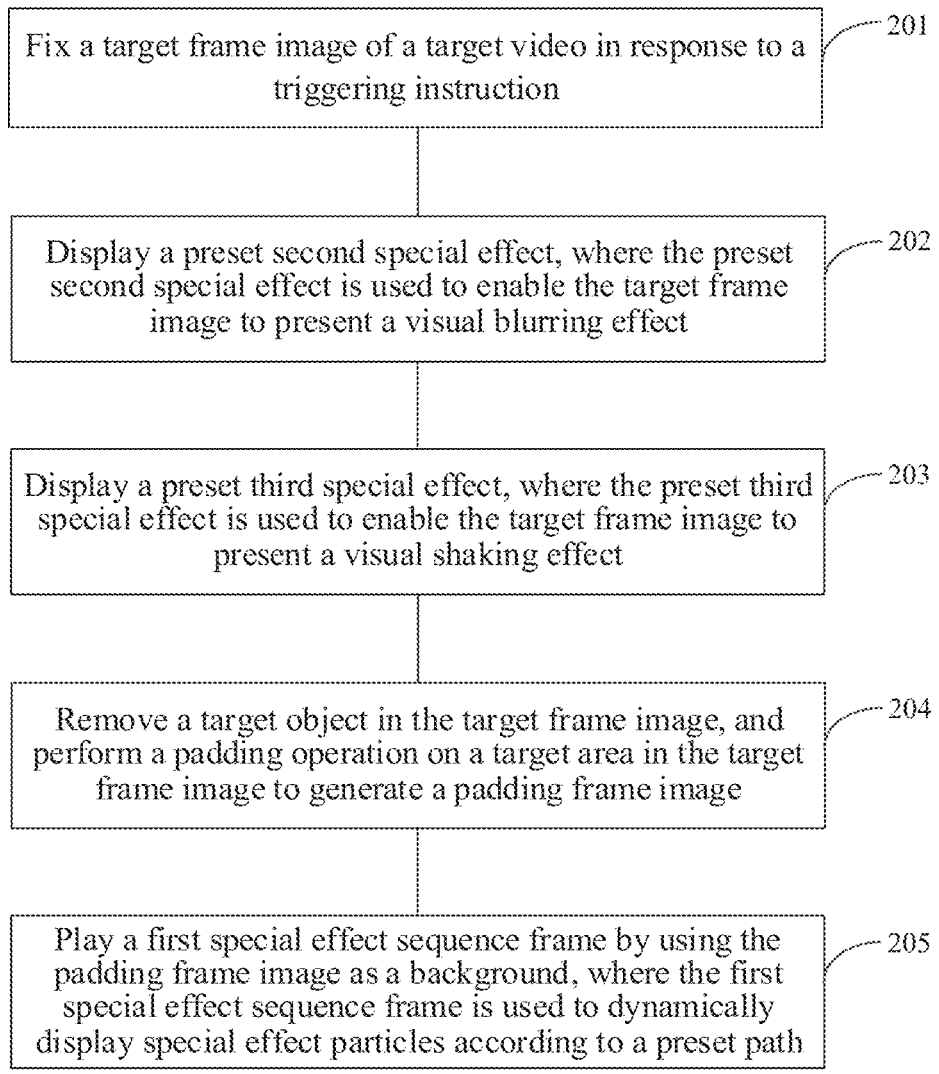
FIG. 7 is a schematic flowchart of a video processing method according to another exemplary embodiment of the present disclosure.

FIG. 7 is a schematic flowchart of a video processing method according to another exemplary embodiment of the present disclosure. As shown in FIG. 7, the video processing method provided in this embodiment includes the following steps.

Step 201: fix a target frame image of a target video in response to a triggering instruction.

When video shooting is performed on a target object by using a terminal device, a camera on the terminal device is generally aimed at the target object for shooting. It can be understood that, in a process of shooting the target object, the camera may also acquire a target background at the same time in addition to a target object.

In another possible scenario, when a target video is played by using the terminal device, a target object and a target background are usually included in the target video. It can be understood that, when the target video is shot and generated, the target object is shot based on the target background.

The terminal device may respond to the triggering instruction so as to fix the target frame image in the target video, where the target frame image may be a first frame image after the triggering instruction is acquired, and may also be a corresponding frame image after the triggering instruction is acquired for a preset duration.

For ease of understanding, a target person being the target object may be selected as an example for description. With continued reference to FIG. 1, when video shooting is performed on a target person by using the terminal device, a camera on the terminal device is generally aimed at the target person for shooting. It can be understood that, in a framing process, the camera may acquire the target background in addition to the target person.

When the target video is played by using the terminal device, since the target video may include the target object and the target background, relevant images of the target object in the target background are played when the target video is played.

Referring to FIG. 3, when video shooting is performed on a target person or a target video is played by using a terminal device, a target background and the target person are displayed simultaneously on a display screen of the terminal device.

The terminal device fixes a target frame image of the target video in response to a triggering instruction. FIG. 4 is another application scenario diagram of a video processing method according to an exemplary embodiment of the present disclosure. As shown in FIG. 4, the scenario in FIG. 4 is: in a process of recording a target video for a target person, the target person triggers an effect that a person disappears from an image by inputting a target gesture instruction (for example, a finger stretching instruction). When the terminal device identifies the target gesture instruction, a target frame image of a currently shot target video is fixed, where a current frame of the target video may be fixed. In an embodiment, when the terminal device plays the target video, the user may trigger an effect that a person disappears from an image by means of a target gesture instruction (e.g., a finger stretching instruction). When the terminal device identifies the target gesture instruction, a target frame image of a currently shot target video is fixed, where a current frame of the target video may be fixed.

In addition, before a special effect is triggered, it may also be determined first whether a currently shot video includes an object of a target type. For example, it may be determined first that the currently shot video includes a person object, and then a subsequent special effect may be performed in response to a corresponding triggering instruction.

Step 202: display a preset second special effect, where the preset second special effect is used to enable the target frame image to present a visual blurring effect.

After the target frame image of the target video is fixed, the preset second special effect can be displayed, and the preset second special effect is used to enable the target frame image to present a visual blurring effect. By adding the visual blurring effect to the fixed target frame image, a problem of unnatural boundary transition between a padding part and an original background caused by background padding can be avoided.

Step 203: display a preset third special effect, where the preset third special effect is used to enable the target frame image to present a visual shaking effect.

In this step, after the preset second special effect is displayed, the preset third special effect may also be displayed, where the preset third special effect is used to enable the target frame image to present a visual shaking effect. By enabling the target frame image to present the visual shaking effect, a disappearance process of the target object can have a stronger dynamic effect.

It should be noted that, in this embodiment, a sequence between step 202 and step 203 is not limited. Step 202 may be executed before step 203, may be executed after step 203, step 202 and step 203 are executed separately, or only step 202 or step 203 is executed.

Step 204: remove a target object in the target frame image, and perform a padding operation on a target area in the target frame image to generate and display a padding frame image.

After the target frame image is fixed, the target frame image may be processed to achieve an effect that the target object disappears from the target frame image. Specifically, the target object in the target frame image may be removed, and a background padding operation is performed on the target area in the target frame image, so as to generate and display the padding frame image, where the target area is a vacant area after the target object is removed from the target frame image.

With continued reference to the example of the target person being the target object, as shown in FIG. 5, after the target frame image is fixed, the target person in the target frame image may be removed. As shown in FIG. 6, a padding operation may be performed on the target area, that is, the vacant area formed after the target person in the target frame image is removed.

Specifically, a target binary image and the target frame image may be fused to obtain a model inputting image, where a target area in the target binary image includes various pixel points with pixel values being target values.

With continued reference to the example of the target person being the target object, an existing human body segmentation model may be used to acquire a target human body area in an image, so as to obtain a binary image with the same size as that of an original image, where 255 represents that the pixel point does not belong to the target human body area, and 0 represents that the pixel point belongs to the target human body area. Then, the target frame image and the target binary image are scaled according to a specific ratio (for example, a ratio obtained by dividing 256 by a long side of the image), and then fused in an image processing channel. The pixel values are normalized to (−1, 1), so as to obtain the model inputting image.

After the model inputting image is obtained, the model inputting image may continue to be input to an image patching model to perform a background padding operation, so as to generate a processing frame image. Then a target area in the processing frame image is used to replace the target area in the target frame image, so as to generate the padding frame image.

The image patching model may be a model or a combination of a plurality of models, and the image patching model may be provided in a cloud server or a terminal device.

When the image patching model may be provided in the cloud server, the terminal device uploads the target frame image to the cloud server, so that after padding is performed by using a depth learning method, a padding result image is returned to the terminal device. In this manner, uploading an image to the cloud server may increase time consumption of interaction, and network time delay is also uncertain, thereby failing to meet a scenario application with high real-time performance.

If a traditional padding algorithm (for example, patchmatch series algorithms) is adopted at the terminal device, when an area that needs to be padded is relatively large (for example, a scene of background padding a target human body listed in the foregoing example), semantic continuity of a padding result is very poor. Therefore, the image patching model (for example, the image patching model including a first image patching model and a second image patching model) may be provided in the terminal device, and the model inputting image is input into the first image patching model to generate a first padding image. The model inputting image may be input into the first image patching model with relatively low precision to obtain a rough padding result image, i.e., the first padding image.

Then, pixel truncation is performed on the first padding image by using a preset pixel threshold value, so as to generate a second padding image. Then, the second padding image is input into the second image patching model so as to generate a third padding image, where the second image patching model has higher patching precision than the first image patching model. Pixel truncation is performed on the third padding image by using the preset pixel threshold value, so as to generate a fourth padding image. Finally, the target area in the target frame image is replaced with a target area in the fourth padding image, so as to generate the padding frame image. Both the first image patching model and the second image patching model may be based on a UNet network structure. Specifically, for the first padding image, truncation may be performed pixel by pixel, that is, a pixel point with a pixel value being less than −1 is set to be −1, a pixel point with a pixel value greater than 1 is set to be 1, and a pixel value of a pixel point with a pixel value between −1 and 1 is maintained as an original value. Then a truncated result image, i.e., the second padding image is input into the second image patching model with higher precision, so as to obtain a modified padding result image, i.e., the third padding image. Then, with regard to the above-described third padding image, truncation may also be continuously performed pixel by pixel, i.e., a pixel point with a pixel value being less than −1 is set to be −1, a pixel point with a pixel value greater than 1 is set to be 1, and a pixel value of a pixel point with a pixel value between −1 and 1 is maintained as an original value. A result image is scaled to the size of the original image, and then the human body area of the original image is replaced with a part corresponding to the human body area of the result image to obtain a final result image, i.e., the required padding frame image.

In addition, as shown in FIG. 3 to FIG. 6, in a process of recording a target video for a target person, a user performs triggering by inputting a triggering instruction, so as to implement a special effect that the target person disappears from the target video in response to the user's triggering instruction in the process of video recording.

By the same reasoning, when a target video is played by using the terminal device, the target video includes a target background at the same time in addition to a target person. In this case, a user may input a triggering instruction (for example, a target gesture instruction, a target voice instruction, a target expression instruction, a target text instruction, and a target limb instruction, etc.) to the terminal device, so as to trigger a target effect, thereby fixing a target frame image in a currently shot target video.

In addition, it should be noted that, the triggering instruction may be a triggering instruction input by a user, may also be a triggering instruction sent by a target object in a video, and may further include a triggering instruction sent by a terminal under a preset condition (for example, a video is played to a certain preset moment, etc.). Furthermore, the target person being the target object is only an example for ease of understanding, and in this embodiment, the target object may be in a form of a target person, a target animal, a target building, and the like, which is not specifically limited herein. In addition, the foregoing triggering instruction may also be in a form of a target gesture instruction, a target voice instruction, a target expression instruction, a target text instruction, a target limb instruction, and the like, which is not specifically limited herein.

Step 205: play a first special effect sequence frame by using the padding frame image as a background, where the first special effect sequence frame is used to dynamically display special effect particles according to a preset path.

After the padding frame image is generated, the first special effect sequence frame may be played by using the padding frame image as a background, where the first special effect sequence frame is used to dynamically display special effect particles according to a preset path. By enabling the target frame image to present an effect of special particles, the atmosphere can be enriched, and an effect of the target object can be presented more naturally, and a more dynamic effect is achieved.

In addition, based on the foregoing embodiments, after the padding frame image is generated, a background padding operation may be continuously performed on the target area in a subsequent frame image of the target video, where the subsequent frame image is located after the padding frame image in the target video. By continuously performing the padding operation on the target area in the subsequent frame image of the target video, the effect that the target object continuously disappears from the target video is achieved. The target person being the target object may continue to be taken as an example for description. A padding operation may be performed on the target area, that is, the vacant area formed after the target person in the target frame image is removed. Then, the user continues to shoot the target person, and since the target person is continuously removed in the subsequent frame image of the target video and the background padding is continuously performed, an effect that the target person continuously disappears from the target video can be achieved, i.e., a visual effect that the target person is invisible in the target video.

Figure 8:
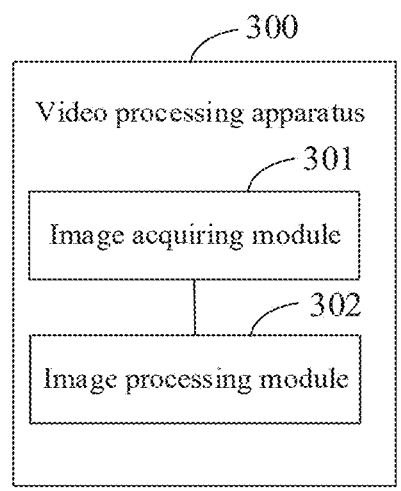
FIG. 8 is a structural schematic diagram of a video processing apparatus according to an exemplary embodiment of the present disclosure.

FIG. 8 is a schematic structural diagram of a video processing apparatus according to an exemplary embodiment of the present disclosure. As shown in FIG. 8, a video processing apparatus 300 provided in this embodiment includes:

an image acquiring module 301, configured to fix a target frame image in a target video in response to a triggering instruction; and an image processing module 302, configured to remove a target object in the target frame image, and perform a padding operation on a target area in the target frame image so as to generate and display a padding frame image, where the target area includes a vacant area after the target object is removed from the target frame image.

According to one or more embodiments of the present disclosure, the image processing module 302 is further configured to play a first special effect sequence frame by using the padding frame image as a background, where the first special effect sequence frame is used to dynamically display special effect particles according to a preset path.

According to one or more embodiments of the present disclosure, the image processing module 302 is further configured to display a preset second special effect, where the preset second special effect is used to enable the target frame image to present a visual blurring effect.

According to one or more embodiments of the present disclosure, the image processing module 302 is further configured to display a preset third special effect, where the preset third special effect is used to enable the target frame image to present a visual shaking effect.

According to one or more embodiments of the present disclosure, the image processing module 302 is further configured to continuously perform a padding operation on the target area in a subsequent frame image of the target video, where the subsequent frame image is located after the padding frame image in the target video.

According to one or more embodiments of the present disclosure, the image processing module 302 is further configured to determine that the target object is an object of a target type.

According to one or more embodiments of the present disclosure, the triggering instruction includes at least one of a target gesture instruction, a target voice instruction, a target expression instruction, a target limb instruction, a target text instruction.

Figure 10:
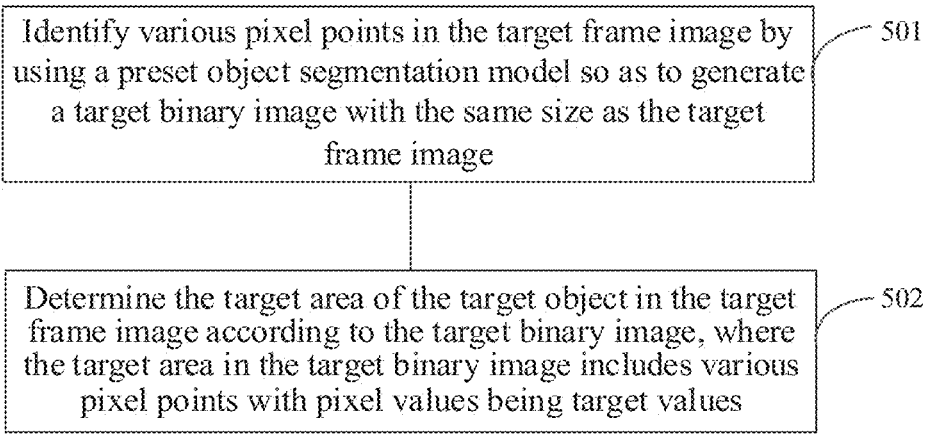
FIG. 10 is a flowchart showing a method for video processing according to an exemplary embodiment of the present disclosure.

According to one or more embodiments of the present disclosure, the image processing module 302 is configured to:

identify various pixel points in the target frame image by using a preset object segmentation model so as to generate a target binary image with the same size as the target frame image (step 501 in FIG. 10); and determine the target area of the target object in the target frame image according to the target binary image, where the target area in the target binary image includes various pixel points with pixel values being target values (step 502 in FIG. 10).

Figure 11:
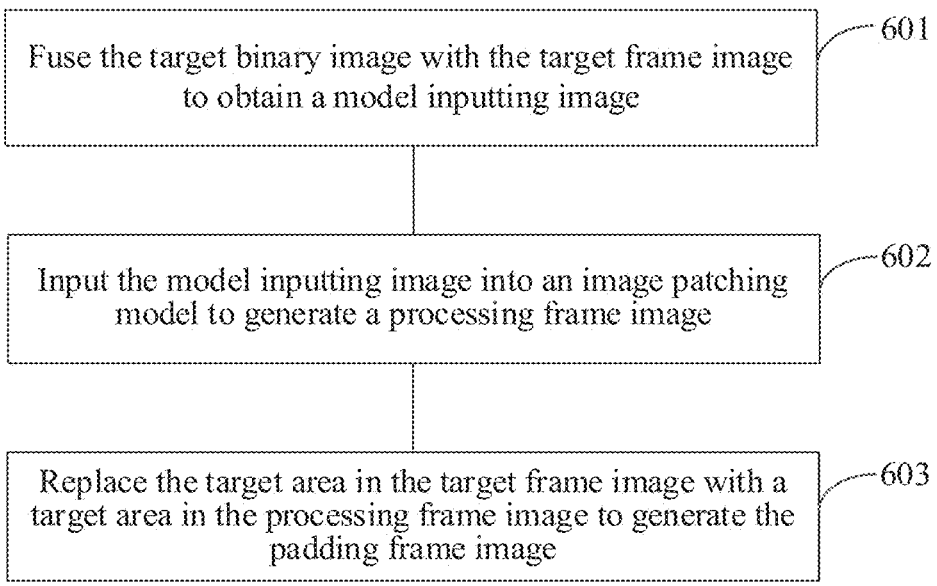
FIG. 11 is a flowchart showing a method for video processing according to an exemplary embodiment of the present disclosure.

According to one or more embodiments of the present disclosure, the image processing module 302 is configured to:
- fuse the target binary image with the target frame image to obtain a model inputting image (step 601 in FIG. 11);
- input the model inputting image into an image patching model to generate a processing frame image (step 602 in FIG. 11); and
- replacing the target area in the target frame image with a target area in the processing frame image to generate the padding frame image (step 603 in FIG. 11).

According to one or more embodiments of the present disclosure, the image patching model is provided in a terminal device, and the terminal device is configured to process the target video based on the image patching model.

Figure 12:
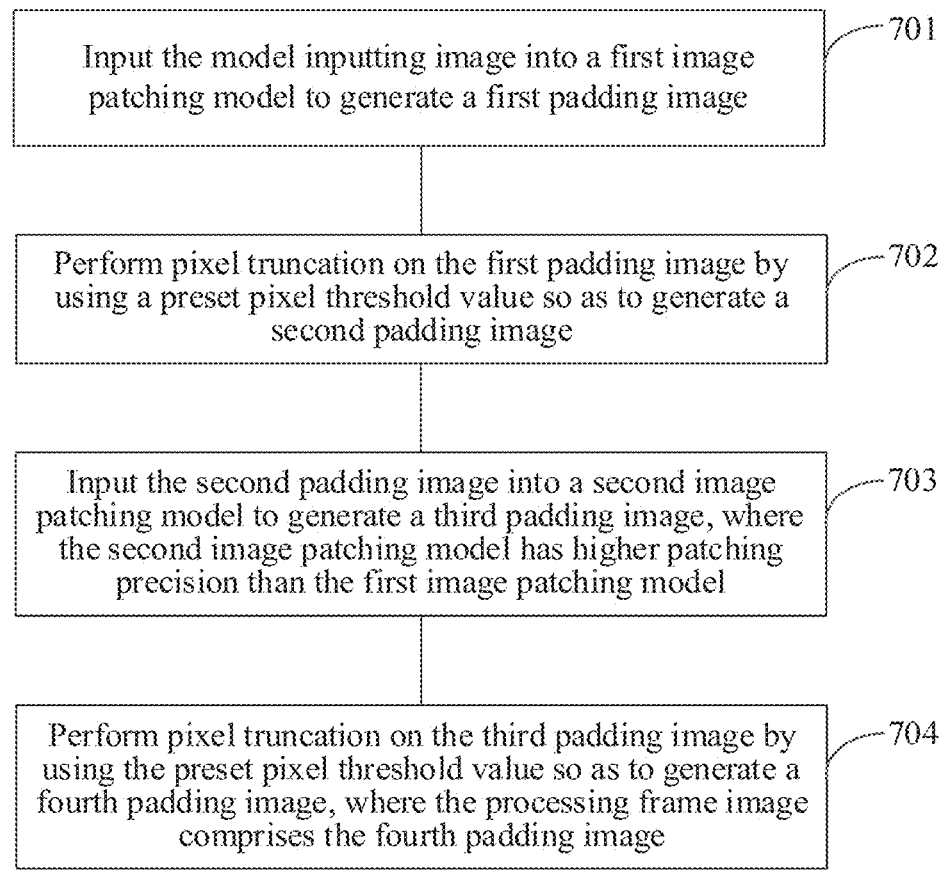
FIG. 12 is a flowchart showing a method for video processing according to an exemplary embodiment of the present disclosure.

According to one or more embodiments of the present disclosure, the image processing module 302 is specifically configured to:
- input the model inputting image into a first image patching model to generate a first padding image (step 701 in FIG. 12);
- perform pixel truncation on the first padding image by using a preset pixel threshold value so as to generate a second padding image (step 702 in FIG. 12);
- input the second padding image into a second image patching model to generate a third padding image, where the second image patching model has higher patching precision than the first image patching model (step 703 in FIG. 12); and
- perform pixel truncation on the third padding image by using the preset pixel threshold value so as to generate a fourth padding image, where the processing frame image includes the fourth padding image (step 704 in FIG. 12).

It should be noted that, the video processing apparatus provided in the embodiment shown in FIG. 8 may be configured to execute the method steps provided in any one of the foregoing method embodiments, specific implementations and technical effects are similar, which are not repeatedly described herein.

Figure 9:
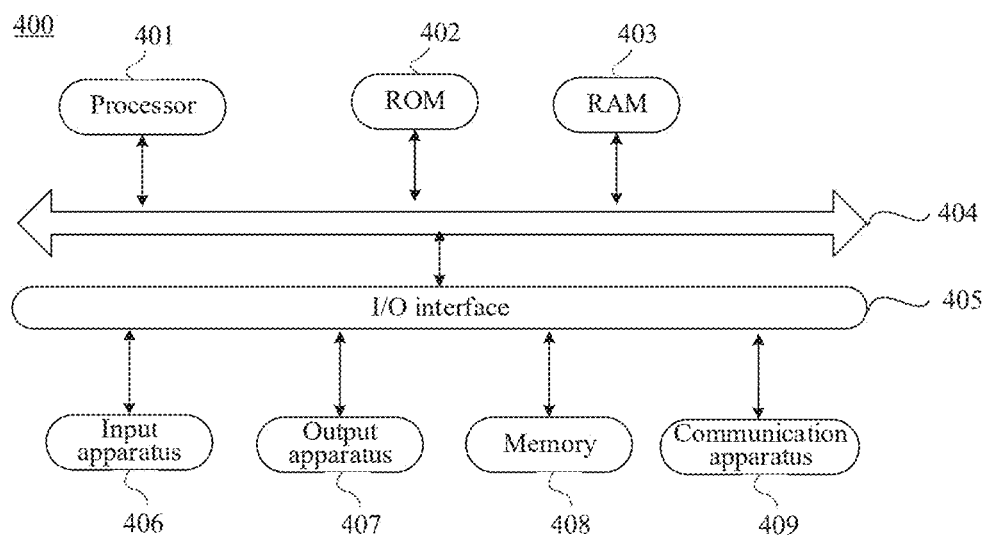
FIG. 9 is a structural schematic diagram of an electronic device according to an exemplary embodiment of the present disclosure.

FIG. 9 is a schematic structural diagram of an electronic device according to an exemplary embodiment of the present disclosure, and as shown in FIG. 9, it shows a schematic structural diagram of an electronic device 400 suitable for implementing the embodiments of the present disclosure. The terminal device in the embodiments of the present disclosure may include, but is not limited to, a mobile terminal with an image acquiring function such as a mobile phone, a laptop computer, a digital broadcast receiver, a PDA (Personal Digital Assistant), a PAD (Portable Android Device), a PMP (Portable Media Player), a vehicle-mounted terminal (for example, a vehicle-mounted navigation terminal) and the like, and a fixed terminal externally connected to an image acquiring device such as a digital TV (Television), a desktop computer and the like. The electronic device shown in FIG. 9 is merely an example and should not bring any limitation to the functions and scope of use of the embodiments of the present disclosure.

As shown in FIG. 9, the electronic device 400 may include a processor (e.g., a central processor, a graphics processor, etc.) 401 that may perform various suitable actions and processing in accordance with a program stored in a read only memory (Read Only Memory, ROM) 402 or a program loaded into a random access memory (Random Access Memory, RAM) 403 from a memory 408. In the RAM 403, various programs and data necessary for the operation of the electronic device 400 are also stored. The processor 401, the ROM 402 and the RAM 403 are connected to each other via a bus 404. An input/output (I/O) interface 405 is also connected to the bus 404. The memory is configured to store a program for executing the video processing method of each of the foregoing method embodiments; and the processor is configured to execute the program stored in the memory.

In general, the following apparatuses may be connected to the I/O interface 405: an input apparatus 406 including, for example, a touch screen, a touch pad, a keyboard, a mouse, a camera, a microphone, an accelerometer, a gyroscope and the like; an output apparatus 407 including, for example, a liquid crystal display (Liquid Crystal Display, LCD), a speaker, a vibrator and the like; and a communication apparatus 409. The communication apparatus 409 may allow the electronic device 400 to perform wireless or wired communication with other devices to exchange data. Although FIG. 9 illustrates the electronic device 400 with a variety of apparatuses, it should be understood that, it is not necessary that all of the illustrated apparatuses should be implemented or provided. More or fewer apparatuses may alternatively be implemented or provided.

In particular, the processes described above with reference to the flowcharts can be implemented as computer software programs according to the embodiments of the present disclosure. For example, an embodiment of the present disclosure includes a computer-readable storage medium including a computer program carried on a non-transitory computer-readable medium. The computer program includes program codes for executing the video processing method as shown in the flowcharts according to the embodiments of the present disclosure. In such an embodiment, the computer program may be downloaded and installed from a network via the communication apparatus 409, or installed from the memory 408, or installed from the ROM 402. When the computer program is executed by the processor 401, the above described video processing functions defined in the method embodiments of the present disclosure are executed.

It should be noted that, the computer-readable medium in the present disclosure may be a computer-readable signal medium or a computer-readable storage medium, or any combination thereof. The computer-readable storage medium may be, for example, but not limited to, an electronic, magnetic, optical, electromagnetic, infrared or semiconductor system, apparatus or device, or any suitable combination of the foregoing. More specific examples of the computer-readable storage medium may include, but are not limited to, an electrical connection based on one or more wires, a portable computer diskette, a hard disk, a random access memory (RAM), a read only memory (ROM), an erasable programmable read only memory (EPROM or Flash memory), an optical fiber, a portable compact disc read only memory (CD-ROM), an optical storage device, a magnetic storage device, or any suitable combination of the foregoing. In the present disclosure, the computer-readable storage medium may be any tangible medium that contains or stores a program for use by or in combination with an instruction execution system, apparatus or device. While in the present disclosure, the computer-readable signal medium may include data signals propagated in a baseband or as part of a carrier wave, in which computer-readable program codes are carried. Such propagated signals may take a variety of forms, including, but not limited to, an electromagnetic signal, an optical signal, or any suitable combination thereof. The computer-readable signal medium may also be any computer-readable medium that is not a computer-readable storage medium, and can send, propagate or transmit a program for use by or in combination with an instruction execution system, apparatus or device. Program codes contained on the computer-readable medium may be transmitted using any appropriate medium, including, but not limited to, a wireline, an optical fiber cable, RF (radio frequency), etc., or any suitable combination of the foregoing.

The computer-readable medium may be included in the electronic device, or may exist alone and not be installed in the electronic device.

The computer-readable medium carries one or more programs, and when the one or more programs are executed by the electronic device, the electronic device is caused to: fix a target frame image of a target video in response to a triggering instruction; and remove a target object in the target frame image, and perform a padding operation on a target area in the target frame image so as to generate and display a padding frame image, where the target area includes a vacant area after the target object is removed from the target frame image.

Computer program codes for carrying out operations of the present disclosure may be written in one or more programming languages or any combination thereof, including an object oriented programming language such as Java, Smalltalk, C++ and a conventional procedural programming language such as C programming language or similar programming languages. The program codes may be executed entirely on a user computer, executed partly on the user computer, executed as a stand-alone software package, executed partly on the user computer and partly on a remote computer, or executed entirely on the remote computer or server. In the scenario involving the remote computer, the remote computer may be connected to the user computer through any type of network, including a local area network (Local Area Network, LAN) or a wide area network (Wide Area Network, WAN), or may be connected to an external computer (for example, through the Internet of an Internet service provider).

In some embodiments, a client and a server can communicate by using any currently known or future developed network protocols such as HTTP (Hypertext Transfer Protocol) and can be interconnected with digital data communication (e.g., a communication network) in any form or medium. Examples of the communication network include a local area network (LAN), a wide area network (WAN), an internetwork (e.g., the Internet), and a peer-to-peer network (e.g., an ad hoc peer-to-peer network), as well as any currently known or future developed network.

The flowcharts and block diagrams in the accompanying drawings illustrate architectures, functionalities and operations of possible implementations of systems, methods and computer program products according to various embodiments of the present disclosure. In this regard, each block in the flowcharts or block diagrams may represent a module, a program segment, or a portion of code, which includes one or more executable instructions for implementing specified logical function(s). It should also be noted that, in some alternative implementations, the functions noted in the blocks may be implemented in an order different from those noted in the drawings. For example, two blocks shown in succession may, in fact, be executed substantially concurrently, or the blocks may sometimes be executed in the reverse order, depending upon the involved functionality. It should also be noted that, each block of the block diagrams and/or flowcharts and combinations of blocks in the block diagrams and/or flowcharts can be implemented by special-purpose hardware-based systems that perform specified functions or operations, or combinations of special-purpose hardware and computer instructions.

The modules involved in the embodiments of the present disclosure may be implemented through software or hardware. The name of a module does not constitute a limitation to the module itself in some cases.

The above functions described herein may be performed, at least in part, by one or more hardware logic components. For example, unrestrictedly, exemplary types of hardware logic components that can be used include: a Field Programmable Gate Array (FPGA), an Application Specific Integrated Circuit (ASIC), an Application Specific Standard Product (ASSP), a System on chip (SOC), a Complex Programmable Logic Device (CPLD), etc.

In the context of the present disclosure, a machine-readable medium may be a tangible medium that may contain or store a program for use by or in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the foregoing. More specific examples of the machine-readable storage medium include an electrical connection based on one or more wires, a portable computer diskette, a hard disk, a random access memory (RAM), a read only memory (ROM), an erasable programmable read only memory (EPROM or Flash memory), an optical fiber, a compact disc read only memory (CD-ROM), an optical storage device, a magnetic storage device, or any suitable combination of the foregoing.

In a first aspect, according to one or more embodiments of the present disclosure, provided is a video processing method, including:

fixing a target frame image in a target video in response to a triggering instruction; and removing a target object in the target frame image, and performing a padding operation on a target area in the target frame image so as to generate and display a padding frame image, where the target area includes a vacant area after the target object is removed from the target frame image.

According to one or more embodiments of the present disclosure, after the generating and displaying the padding frame image, the method further includes:

playing a first special effect sequence frame by using the padding frame image as a background, where the first special effect sequence frame is used to dynamically display special effect particles according to a preset path.

According to one or more embodiments of the present disclosure, after the fixing the target frame image of the target video, the method further includes:

displaying a preset second special effect, where the preset second special effect is used to enable the target frame image to present a visual blurring effect.

According to one or more embodiments of the present disclosure, after the fixing the target frame image of the target video, the method further includes:

displaying a preset third special effect, where the preset third special effect is used to enable the target frame image to present a visual shaking effect.

According to one or more embodiments of the present disclosure, after generating and displaying the padding frame image, the method further includes:

continuously performing a padding operation on the target area in a subsequent frame image of the target video, where the subsequent frame image is located after the padding frame image in the target video.

According to one or more embodiments of the present disclosure, before acquiring the triggering instruction, the method further includes:

determining that the target object is an object of a target type.

According to one or more embodiments of the present disclosure, the triggering instruction includes at least one of a target gesture instruction, a target voice instruction, a target expression instruction, a target limb instruction, a target text instruction.

According to one or more embodiments of the present disclosure, the removing the target object in the target frame image and performing the padding operation on the target area in the target frame image includes:

identifying various pixel points in the target frame image by using a preset object segmentation model so as to generate a target binary image with the same size as the target frame image; and determining the target area of the target object in the target frame image according to the target binary image, where the target area in the target binary image includes various pixel points with pixel values being target values.

According to one or more embodiments of the present disclosure, the performing the padding operation on the target area in the target frame image includes:

fusing the target binary image with the target frame image to obtain a model inputting image;

inputting the model inputting image into an image patching model to generate a processing frame image; and replacing the target area in the target frame image with a target area in the processing frame image to generate the padding frame image.

According to one or more embodiments of the present disclosure, the image patching model is provided in a terminal device, and the terminal device is configured to process the target video based on the image patching model.

According to one or more embodiments of the present disclosure, the inputting the model inputting image into the image patching model to generate the processing frame image includes:

inputting the model inputting image into a first image patching model to generate a first padding image;

performing pixel truncation on the first padding image by using a preset pixel threshold value so as to generate a second padding image;

inputting the second padding image into a second image patching model to generate a third padding image, where the second image patching model has higher patching precision than the first image patching model; and performing pixel truncation on the third padding image by using the preset pixel threshold value so as to generate a fourth padding image, where the processing frame image includes the fourth padding image.

In a second aspect, according to one or more embodiments of the present disclosure, provided is a video processing apparatus, including:

an image acquiring module, configured to fix a target frame image of a target video in response to a triggering instruction;

an image processing module, configured to remove a target object in the target frame image, and perform a padding operation on a target area in the target frame image so as to generate and display a padding frame image, where the target area includes a vacant area after the target object is removed from the target frame image.

According to one or more embodiments of the present disclosure, the image processing module is further configured to play a first special effect sequence frame by using the padding frame image as a background, where the first special effect sequence frame is used to dynamically display special effect particles according to a preset path.

According to one or more embodiments of the present disclosure, the image processing module is further configured to display a preset second special effect, where the preset second special effect is used to enable the target frame image to present a visual blurring effect.

According to one or more embodiments of the present disclosure, the image processing module is further configured to display a preset third special effect, where the preset third special effect is used to enable the target frame image to present a visual shaking effect.

According to one or more embodiments of the present disclosure, the image processing module is further configured to continuously perform a padding operation on the target area in a subsequent frame image of the target video, where the subsequent frame image is located after the padding frame image in the target video.

According to one or more embodiments of the present disclosure, the image processing module is further configured to determine that the target object is an object of a target type.

According to one or more embodiments of the present disclosure, the triggering instruction includes at least one of a target gesture instruction, a target voice instruction, a target expression instruction, a target limb instruction, a target text instruction.

According to one or more embodiments of the present disclosure, the image processing module is specifically configured to:

identify various pixel points in the target frame image by using a preset object segmentation model so as to generate a target binary image with the same size as the target frame image; and determine the target area of the target object in the target frame image according to the target binary image, where the target area in the target binary image includes various pixel points with pixel values being target values.

According to one or more embodiments of the present disclosure, the image processing module is specifically configured to:

fuse the target binary image with the target frame image to obtain a model inputting image; and input the model inputting image into an image patching model to generate a processing frame image; and replacing the target area in the target frame image with a target area in the processing frame image to generate the padding frame image.

According to one or more embodiments of the present disclosure, the image patching model is provided in a terminal device, and the terminal device is configured to process the target video based on the image patching model.

According to one or more embodiments of the present disclosure, the image processing module is specifically configured to:

input the model inputting image into a first image patching model to generate a first padding image;

perform pixel truncation on the first padding image by using a preset pixel threshold value so as to generate a second padding image;

input the second padding image into a second image patching model to generate a third padding image, where the second image patching model has higher patching precision than the first image patching model; and perform pixel truncation on the third padding image by using the preset pixel threshold value so as to generate a fourth padding image, where the processing frame image includes the fourth padding image.

In a third aspect, an embodiment of the present disclosure provides an electronic device, including:

a processor; and a memory, configured to store a computer program of the processor;

a display, configured to display a video after processing by the processor;

where the processor is configured to implement the video processing method in the above first aspect and various possible designs of the first aspect by executing the computer program.

In a fourth aspect, an embodiment of the present disclosure provides a computer readable storage medium. The computer readable storage medium stores computer execution instructions. When a processor executes the computer execution instructions, the video processing method in the above first aspect and various possible designs of the first aspect is implemented.

In a fifth aspect, an embodiment of the present disclosure provides a computer program product. The program product includes a computer program, when the computer program is executed by a processing apparatus, steps of the method in any embodiment of the present disclosure is implemented.

The foregoing description is merely illustrative of the preferred embodiments of the present disclosure and of the technical principles applied thereto. It should be appreciated by a person skilled in the art that, the disclosure scope of the present disclosure is not limited to the technical solutions formed by specific combinations of the described technical features, and meanwhile should also cover other technical solutions formed by any combination of the described technical features or equivalent features thereof without departing from the described disclosed concept, for example, technical solutions formed by substituting the above features and technical features having similar functions as disclosed in the present disclosure (but not limited thereto) for one another.

In addition, while operations are depicted in a particular order, it should not be understood as that the operations need to be performed in a particular order as shown or in a sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented separately or in any suitable sub-combination in a plurality of embodiments.

Although the subject matter has been described in language specific to structural features and/or method logical acts, it should be understood that, the subject matter defined in the appended claims is not necessarily limited to the specific features or acts described above. Rather, the specific features and acts described above are merely illustrative forms for implementing the claims.

What is claimed is:

1. A video processing method, comprising:

fixing a target frame image in a target video in response to a triggering instruction; and removing a target object in the target frame image, and performing a padding operation on a target area in the target frame image so as to generate and display a padding frame image, wherein the target area comprises a vacant area after the target object is removed from the target frame image, wherein the removing the target object in the target frame image and performing the padding operation on the target area in the target frame image comprises:

identifying various pixel points in the target frame image by using a preset object segmentation model so as to generate a target binary image with the same size as the target frame image; and determining the target area of the target object in the target frame image according to the target binary image, wherein the target area in the target binary image comprises various pixel points with pixel values being target values.

2. The video processing method according to claim 1, wherein after the generating and displaying the padding frame image, the method further comprises:

playing a first special effect sequence frame by using the padding frame image as a background, wherein the first special effect sequence frame is used to dynamically display special effect particles according to a preset path.

3. The video processing method according to claim 1, wherein after the fixing the target frame image of the target video, the method further comprises:

displaying a preset second special effect, wherein the preset second special effect is used to enable the target frame image to present a visual blurring effect.

4. The video processing method according to claim 1, wherein after the fixing the target frame image of the target video, the method further comprises:

displaying a preset third special effect, wherein the preset third special effect is used to enable the target frame image to present a visual shaking effect.

5. The video processing method according to claim 1, wherein after generating and displaying the padding frame image, the method further comprises:

continuously performing a padding operation on the target area in a subsequent frame image of the target video, wherein the subsequent frame image is located after the padding frame image in the target video.

6. The video processing method according to claim 1, further comprising:

determining that the target object is an object of a target type, wherein the target object or the object of the target type comprises at least one of a target person, a target animal, or a target building.

7. The video processing method according to claim 1, wherein the triggering instruction comprises at least one of a target gesture instruction, a target voice instruction, a target expression instruction, a target limb instruction, or a target text instruction.

8. The video processing method according to claim 1, wherein the performing the padding operation on the target area in the target frame image comprises:
   fusing the target binary image with the target frame image to obtain a model inputting image;
   inputting the model inputting image into an image patching model to generate a processing frame image; and
   replacing the target area in the target frame image with a target area in the processing frame image to generate the padding frame image.

9. The video processing method according to claim 8, wherein the image patching model is provided in a terminal device, and the terminal device processes the target video based on the image patching model.

10. The video processing method according to claim 8, wherein the inputting the model inputting image into the image patching model to generate the processing frame image comprises:
   inputting the model inputting image into a first image patching model to generate a first padding image;
   performing pixel truncation on the first padding image by using a preset pixel threshold value so as to generate a second padding image;
   inputting the second padding image into a second image patching model to generate a third padding image, wherein the second image patching model has higher patching precision than the first image patching model; and
   performing pixel truncation on the third padding image by using the preset pixel threshold value so as to generate a fourth padding image, wherein the processing frame image comprises the fourth padding image.

11. An electronic device, comprising:
   a processor; and
   a memory, configured to store a computer program;
   a display, configured to display a video after processing by the processor;
   wherein the processor is configured to:
      fix a target frame image in a target video in response to a triggering instruction;
      remove a target object in the target frame image, and performing a padding operation on a target area in the target frame image so as to generate and display a padding frame image, wherein the target area comprises a vacant area after the target object is removed from the target frame image;
      identify various pixel points in the target frame image by using a preset object segmentation model so as to generate a target binary image with the same size as the target frame image; and
      determine the target area of the target object in the target frame image according to the target binary image, wherein the target area in the target binary image comprises various pixel points with pixel values being target values.

12. The electronic device according to claim 11, wherein the processor is further configured to:
   play a first special effect sequence frame by using the padding frame image as a background, wherein the first special effect sequence frame is used to dynamically display special effect particles according to a preset path.

13. The electronic device according to claim 11, wherein the processor is further configured to:
   display a preset second special effect, wherein the preset second special effect is used to enable the target frame image to present a visual blurring effect.

14. The electronic device according to claim 11, wherein the processor is further configured to:
   display a preset third special effect, wherein the preset third special effect is used to enable the target frame image to present a visual shaking effect.

15. The electronic device according to claim 11, wherein the processor is further configured to:
   continuously perform a padding operation on the target area in a subsequent frame image of the target video, wherein the subsequent frame image is located after the padding frame image in the target video.

16. A non-transitory computer readable storage medium, wherein the computer readable storage medium stores computer execution instructions, and when a processor executes the computer execution instructions, the following operations are executed:
   fixing a target frame image in a target video in response to a triggering instruction; and
   removing a target object in the target frame image, and performing a padding operation on a target area in the target frame image so as to generate and display a padding frame image, wherein the target area comprises a vacant area after the target object is removed from the target frame image,
   wherein the removing the target object in the target frame image and performing the padding operation on the target area in the target frame image comprises:
      identifying various pixel points in the target frame image by using a preset object segmentation model so as to generate a target binary image with the same size as the target frame image; and
      determining the target area of the target object in the target frame image according to the target binary image, wherein the target area in the target binary image comprises various pixel points with pixel values being target values.

17. The non-transitory computer readable storage medium according to claim 16, wherein after the generating and displaying the padding frame image, the following operation are further executed:
   playing a first special effect sequence frame by using the padding frame image as a background, wherein the first special effect sequence frame is used to dynamically display special effect particles according to a preset path.

18. The non-transitory computer readable storage medium according to claim 16, wherein after the fixing the target frame image of the target video, the following operation are further executed:
   displaying a preset second special effect, wherein the preset second special effect is used to enable the target frame image to present a visual blurring effect.

19. The non-transitory computer readable storage medium according to claim 16, wherein after the fixing the target frame image of the target video, the following operation are further executed:
   displaying a preset third special effect, wherein the preset third special effect is used to enable the target frame image to present a visual shaking effect.

* * * * *